US006701245B2

(12) United States Patent  
Birkner et al.

(10) Patent No.: US 6,701,245 B2
(45) Date of Patent: Mar. 2, 2004

(54) METHOD FOR THE FUNCTIONAL DIAGNOSIS OF AN EXHAUST RECYCLING SYSTEM ON AN INTERNAL COMBUSTION ENGINE

(75) Inventors: Christian Birkner, Irlbach (DE); Michael Käsbauer, Neutraubling (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/357,563

(22) Filed: Feb. 4, 2003

(65) Prior Publication Data

US 2003/0139873 A1 Jul. 24, 2003

Related U.S. Application Data

(63) Continuation of application No. PCT/DE01/02928, filed on Aug. 1, 2001.

(30) Foreign Application Priority Data

Aug. 4, 2000 (DE) .................................. 100 38 257

(51) Int. Cl.[7] .............................. F02M 25/07; G06F 7/00
(52) U.S. Cl. .................. 701/108; 701/109; 123/568.16; 123/568.19; 73/118.1
(58) Field of Search ................................ 701/108, 109, 701/110; 123/568.15, 568.16, 568.17, 568.19, FOR 127; 73/118.1

(56) References Cited

U.S. PATENT DOCUMENTS

| 5,461,569 | A | | 10/1995 | Hara et al. ............. 364/431.03 |
|---|---|---|---|---|
| 5,513,616 | A | | 5/1996 | Matsumoto et al. ........ 123/571 |
| 5,617,833 | A | | 4/1997 | Tomisawa et al. .......... 123/571 |
| 5,675,080 | A | * | 10/1997 | Wada ......................... 701/108 |
| 5,703,285 | A | | 12/1997 | Shimizu et al. ............ 73/118.1 |
| 5,974,870 | A | * | 11/1999 | Treinies et al. ............ 73/118.2 |
| 6,502,545 | B1 | * | 1/2003 | Ganser et al. .............. 123/399 |

FOREIGN PATENT DOCUMENTS

| DE | 42 19 339 a1 | 1/1993 | .......... F02D/41/22 |
|---|---|---|---|
| DE | 195 27 030 A1 | 2/1996 | .......... F02D/21/08 |
| EP | 0635629 A1 | 1/1995 | .......... F02D/21/08 |
| WO | 02/12702 A1 | 2/2002 | .......... F02M/25/07 |

OTHER PUBLICATIONS

PCT International Written Report PCT/DE01/02928, Jun. 10, 2002.

International Supplemental Form and Publication PCT/DE01/02928.

* cited by examiner

*Primary Examiner*—Hieu T. Vo
(74) *Attorney, Agent, or Firm*—Baker Botts L.L.P.

(57) ABSTRACT

The invention relates to the diagnosis of an exhaust gas recycling valve, whereby, on switching off the internal combustion engine, the throttle valve and the exhaust recycling valve are closed and a check is made of whether a compression is detectable in the cylinders of the internal combustion engine, by means of an engine speed check within a segment. Should an engine speed difference (Ndiff) be greater than a threshold value (Ndiff SW), then an incompletely closed exhaust gas recycling valve is recognized, assuming a complete closure of the throttle valve.

6 Claims, 3 Drawing Sheets

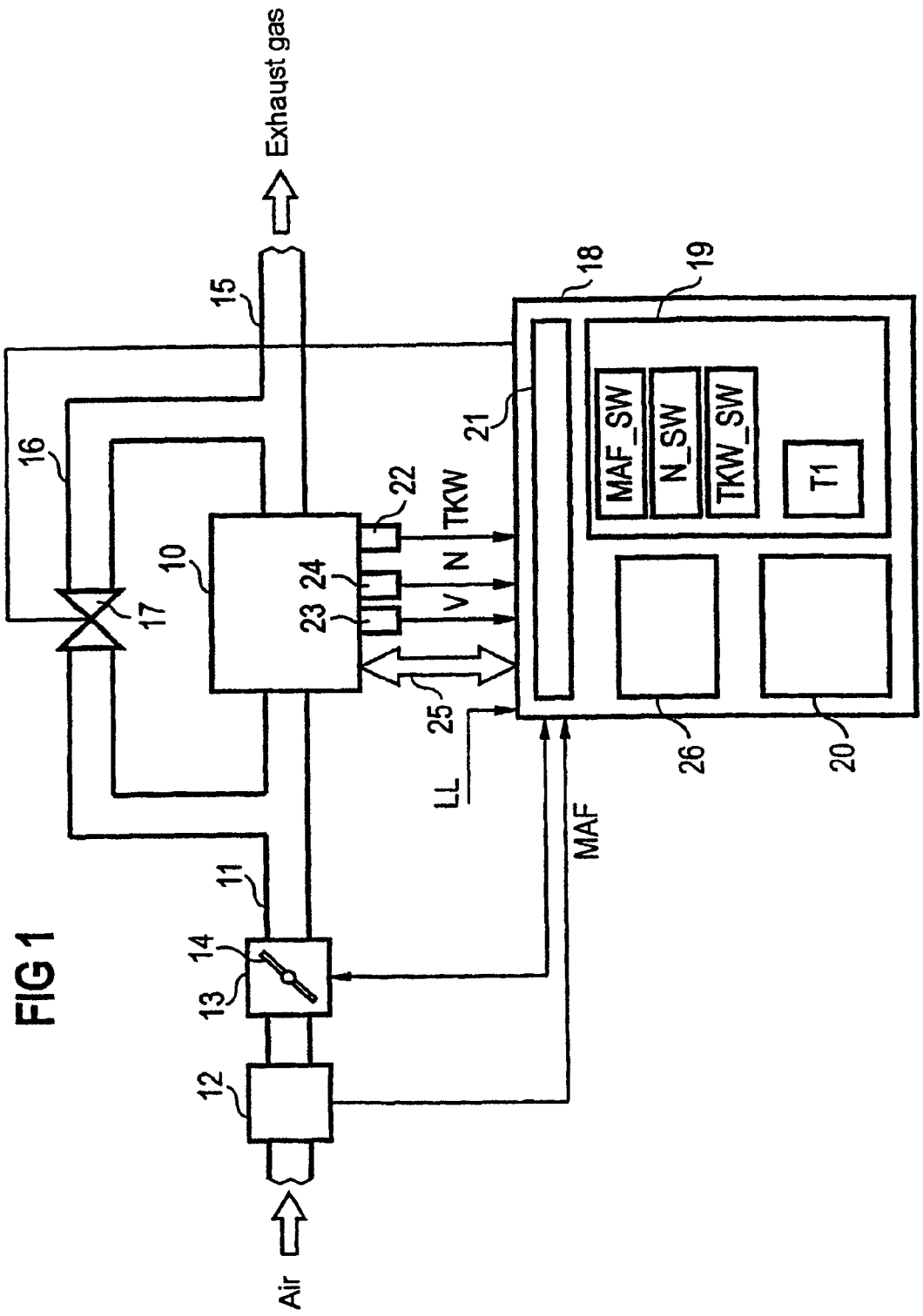

METHOD FOR THE FUNCTIONAL DIAGNOSIS OF AN EXHAUST RECYCLING SYSTEM ON AN INTERNAL COMBUSTION ENGINE

CROSS-REFERENCE TO RELATED APPLICATION

This application is a continuation of co-pending International Application No. PCT/DE01/02928 filed Aug. 1, 2001, which designates the United States, and claims priority to German application number DE10038257.6 filed Aug. 4, 2000.

TECHNICAL FIELD OF THE INVENTION

The invention relates to a method for diagnosing an exhaust gas recycling system of an internal combustion engine according to the preamble of patent claim 1.

BACKGROUND OF THE INVENTION

Exhaust gas recycling systems are used to reduce the nitrogen oxide content in the exhaust gas of an internal combustion engine. A portion of the exhaust gas is recycled from the exhaust gas tract into the intake tract, i.e. into the collector of the intake manifold, via an exhaust gas recycling line. An exhaust gas recycling valve which is arranged in the exhaust gas recycling line is actuated by means of electrical signals of a control device, and the mass of the recycled exhaust gas is thus set. As the exhaust gas of the internal combustion engine is, in its essential components, an inert gas, it is possible to reduce the peak temperature of the combustion by adding exhaust gas to the sucked-in internal combustion air, and thus to reduce the emission of nitrogen oxides. The mass of the recycled exhaust gas in relationship to the sum of the mass of the fresh gas (intake air) and the mass of the recycled exhaust gas is generally referred to as exhaust gas recycling rate.

It is necessary to monitor the controllability of and the possibility of closing such an exhaust gas recycling valve in order to ensure that it is functioning correctly. In order to maintain the exhaust gas limiting values which are required by legislators, it is necessary to equip the vehicles with the diagnostic devices which permit the malfunctions of sensors and systems which are connected to the controller or activation of exhaust-gas-related parts to be registered, and corresponding fault messages to be output. Particularly the checking of all the components of the air path is of particular interest for the fulfillment of legal guidelines for the onboard diagnosis (OBD) of motor vehicles.

In particular the exhaust gas recycling valve must be able to close completely as otherwise the prescribed exhaust gas limiting values may be exceeded when the internal combustion engine is operating with a permanently opened exhaust gas recycling valve.

EP 0 635 629 A1 describes a method for diagnosing an exhaust gas recycling system of an internal combustion engine in which the exhaust gas recycling valve is actuated during the stable idling mode for a specific diagnostic time with a diagnostic pulse duty factor and during this time the reaction to the rotational speed engine operating parameter is evaluated. The difference between the rotational speed which occurs during the stable idling mode of the internal combustion engine before the exhaust gas recycling valve is actuated and that rotational speed which occurs when the system is actuated with a diagnostic pulse duty factor is formed. If the difference exceeds a predefined diagnostic limiting value, it is determined that the exhaust gas recycling system is intact, and otherwise a fault message is output.

DE 195 27 030 A1 discloses an abnormality-registering method and a device for an exhaust gas recycling control system of an internal combustion engine. The abnormality is caused here by an operative lag of a diaphragm which forms an exhaust gas recycling valve. The exhaust gas recycling valve is controlled as a function of the engine operating information including an intake distributor pressure. A condition which is to be fulfilled for the abnormality decision to be activated is registered. When the abnormality decision condition or activation condition is registered, the exhaust gas recycling valve is forcibly opened or closed. A possible abnormality of the exhaust gas recycling valve is decided on the basis of the difference between the intake distributor pressure during forced opening and that during forced closing of the exhaust gas recycling valve.

SUMMARY OF THE INVENTION

The object of the invention is to specify a method with which the operational capability of the exhaust gas recycling system of the internal combustion engine can easily be checked without additional sensor equipment.

This object is achieved according to the invention by the following:

A method for diagnosing the operational capability of an exhaust gas recycling system of an internal combustion engine having cylinders, said system comprising an exhaust gas recycling line which connects an exhaust gas tract of the internal combustion engine to an intake tract, having a throttle valve of the internal combustion engine so that exhaust gas can be recycled into the intake tract; and an exhaust gas recycling valve arranged in the exhaust gas recycling line to set the flow passage of the exhaust gas recycling line, said method comprising the following steps when a fuel supply to the cylinders is switched off and when a vehicle powered by said engine is in a stationary state:

in a first step, the throttle valve and the exhaust gas recycling valve are closed, in a second step, after expiry of a predefined time period, checking to determine whether a air mass flow rate meter signal lies below a predefined threshold value, in a third step, if said value drops below the threshold value, checking to determine whether compression has occurred in the cylinders of the internal combustion engine, and, assessing the desirability of closing the exhaust gas recycling valve as a function of the check.

If the throttle valve and exhaust gas recycling valve are closed when the internal combustion is switched off, the controllability of and possibility of closing the exhaust gas recycling valve can be monitored using an air mass flow rate sensor and a rotational speed sensor which are present in any case. In this way, the operational capability of the exhaust gas recycling valve can be diagnosed during the otherwise fault-free operation of the vehicle and when there are defined output operating parameters by reference to the profile of the signals of these two sensors, using applicable time delays and threshold values.

The invention is distinguished by the fact that, in order to diagnose the exhaust gas recycling valve when the internal combustion engine is switched off, the throttle valve and the exhaust gas recycling valve are closed and a check is made by evaluating the rotational speed within a segment to determine whether a specific degree of compression can still be detected in the cylinders of the internal combustion engine. If a rotational speed difference above a threshold value is present, an incompletely closing exhaust gas recycling valve is detected, assuming complete closure of the throttle valve.

The method has in particular the advantage that no additional sensor equipment is necessary to check the controllability of and possibility of closing the exhaust gas recycling valve.

BRIEF DESCRIPTION OF THE FIGURES

An exemplary embodiment of the invention is explained in more detail below with reference to the schematic drawings, in which:

FIG. 1 shows a block view of an internal combustion engine with an exhaust gas recycling device and a control device for carrying out the method according to the invention.

DETAILED DESCRIPTION OF THE PREFERRED EMBODIMENTS OF THE INVENTION

Figure 2A:
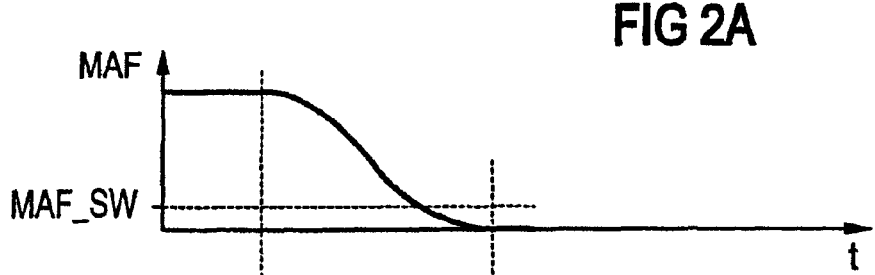
FIG. 2 shows time diagrams for the air mass flow rate and associated rotational speed of the internal combustion engine.

FIG. 1 shows a very simplified block circuit diagram of a diesel internal combustion engine 10 in which the method according to the invention is applied. Here, only those components which are necessary to understand the invention are illustrated. In particular, the fuel circuit and the exhaust gas post-treatment system are not shown. The method according to the invention can, however, also be used in an internal combustion engine with spark ignition, and in this case the actuator and sensors are to be appropriately modified.

The air necessary for combustion is fed to the internal combustion engine 10 via an intake tract 11. An air mass flow rate meter 12 and a throttle valve block 13 are provided in the intake tract 11, one after the other viewed in the direction of flow of the sucked-in air (arrow symbol). Said throttle valve block 13 contains a throttle valve 14 and optionally a throttle valve sensor (not illustrated) which registers a signal corresponding to the angle of aperture of the throttle valve 14.

The throttle valve 14 is, for example, a throttle element which is actuated by an electric motor (electronic exhaust) whose opening cross section can be set both by activation by the driver himself (driver's requirement) and as a function of the operating range of the internal combustion engine by means of electrical signals of a control device.

At the output end, the internal combustion engine 10 is connected to an exhaust gas tract 15, in the further course of which an exhaust gas catalytic converter and a sound damper are arranged (not illustrated).

An exhaust gas recycling line 16 branches off from the exhaust gas tract 15 and opens into the intake tract 11 downstream of the throttle valve block 13. An exhaust gas recycling valve 17, which comprises, for example, an electromagnetic actuator (not illustrated) is arranged in the exhaust gas recycling line (16).

The open-loop and closed-loop control of the internal combustion engine 10 is performed by an electronic control device 18. Such electronic control devices, which generally contain one or more microprocessors, are known per se so that only details of the design and its method for operation which are relevant in the context of the invention are given below. In particular, the control device 18 has a fault memory 20 and a storage device 19 in which various characteristic diagrams and threshold values are stored, the significance of which will be explained in more detail below in the description of the further figures.

The control device 18 also comprises a pre-processing unit 21 which conditions signals of sensors which register operational variables of the internal combustion engine 10. In particular, a signal MAF of the air mass flow rate meter 12, a signal TKW of a coolant temperature sensor 22, a signal v of a speed sensor 23, a signal N of a rotational speed sensor 24 and a signal LL, which characterizes the idling mode of the internal combustion engine 10, are fed to the control device 18. The idling mode may be detected, for example, by evaluating the signal of a pedal value signal generator (not illustrated). The control device 18 is also connected to further sensors and actuators (not illustrated explicitly) via a data/control bus 25.

The electronic control device 18 also has an electrical device 26 for controlling the actuator for the exhaust gas recycling valve 17 which sets the degree of opening of the exhaust gas recycling valve 17 as a function of one or more operational variables of the internal combustion engine.

Figure 3:
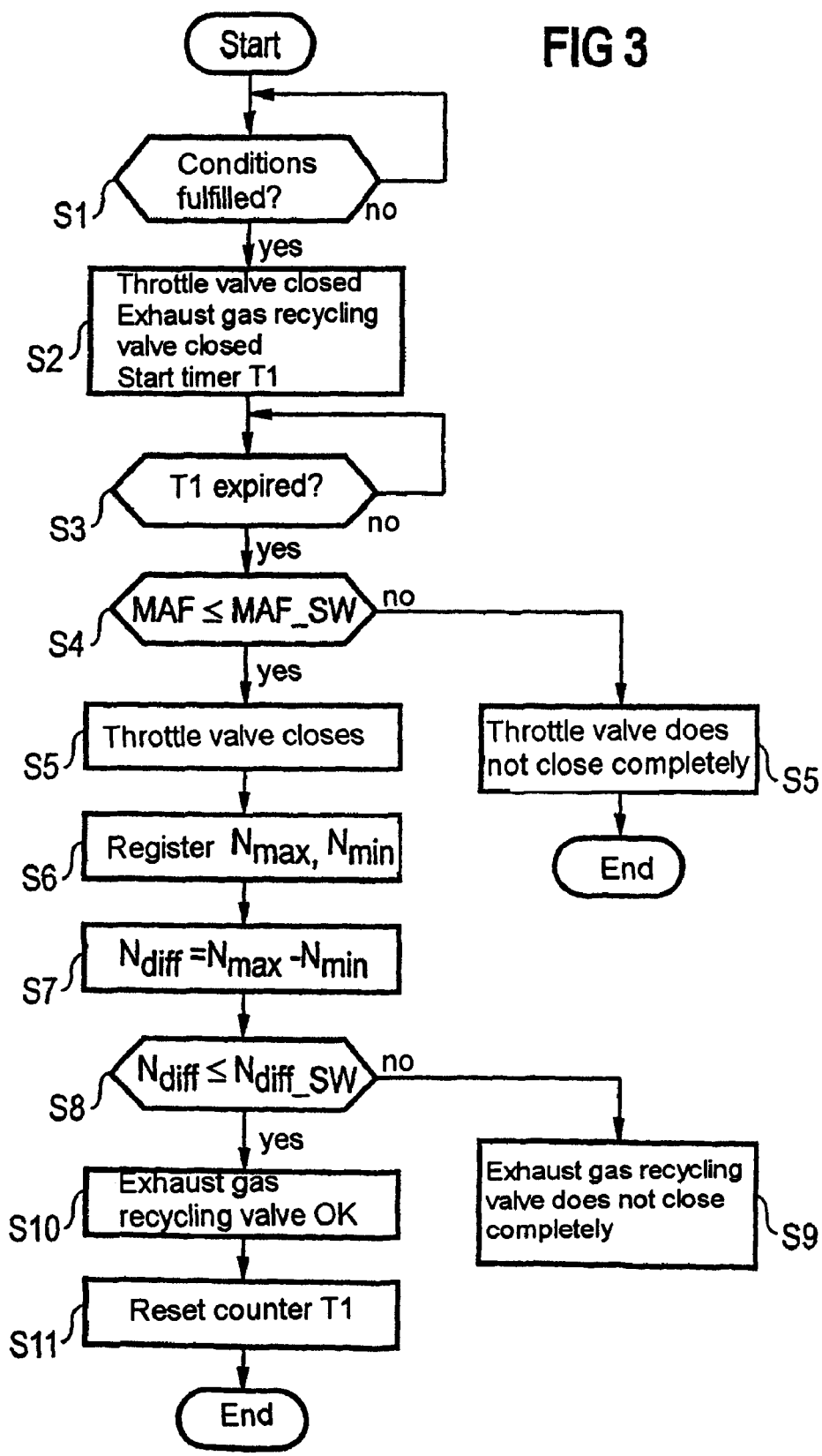
FIG. 3 shows a flowchart of the method.

A flowchart of the method for diagnosing the exhaust gas recycling system is illustrated in FIG. 3.

In a first method step S1 there is an interrogation to determine whether predefined conditions for carrying out the diagnosis are fulfilled. The most important condition for the execution of the diagnosis is that the internal combustion engine is in the idling mode. In order to rule out any adverse effects of the driving mode during the diagnosis, a check is also made to determine whether the vehicle speed v is approximately zero. As vehicle speeds v=0 can be sensed only with a relatively high degree of expenditure, vehicle speeds which are indeed greater than zero but are not yet below a specific, predetermined limiting value (for example 1.8 km/h) are treated as a signal for v=0. Furthermore, the coolant temperature TKW must be above a predefined threshold value TKW_SW (warm internal combustion engine) and there must be no fault entry for the air mass flow rate meter 12 in the fault memory 20.

These interrogations are repeated continuously until the result of the interrogation is positive.

Figure 2B:
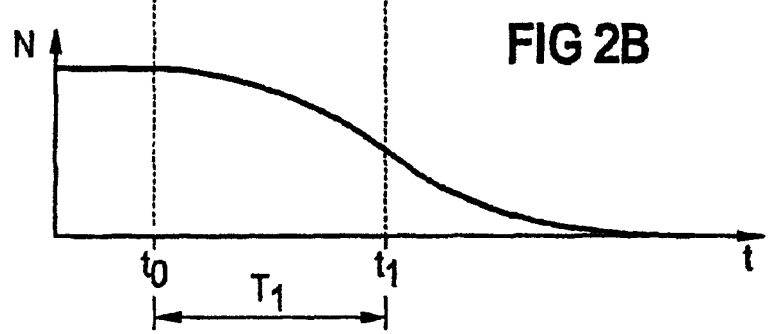

If this is the case, in a method step S2 at the time t0 the throttle valve 14 and the exhaust gas recycling valve 17 are closed and no further mass of fuel is fed. At the same time, a counter for a predefined time period T1 is started. As a consequence of this, the rotational speed N of the internal combustion engine 10 decreases until the internal combustion engine comes completely to a stop. If the throttle valve closes completely, the air mass flow rate drops in a characteristic way until no air mass at all penetrates any more at a time t1, i.e. the air mass flow rate meter 12 supplies a value MAF which lies below an applicable threshold value MAF SW. The time profile of the signal MAF of the air mass flow rate meter 12 is entered in FIG. 2a), and the associated rotational speed signal N is entered in FIG. 2b).

In a method step S3, there is therefore an interrogation to determine whether the time period T1 since the closure of throttle valve 14 and the exhaust gas recycling valve 17 at the time t0 has already elapsed. If the time period T1 has expired, in a method step S4 the current value of the signal MAF of the air mass flow rate meter is compared with the threshold value MAF SW.

In the case of a throttle valve which cannot be closed completely, air continues to pass through and the air mass flow rate drops more slowly, that is to say after the expiry of the time period T1 remains above the threshold value MAF SW.

If the value of the signal MAF of the air mass flow rate meter is above the threshold value MAF SW after the expiry of the time period T1, a corresponding fault entry, for example "throttle valve does not close completely" is made in the fault memory 20 in a method step S5, and the method is at an end. Subsequent checking of the exhaust gas recycling valve with the specified method would give rise to unreliable diagnostic results in the case of a throttle valve which cannot be closed completely.

If, the value for the air mass flow rate MAF is equal to or less than the threshold value MAF SW, i.e. the throttle valve could be closed, after the expiry of the time period T1, it is possible, when switching off the internal combustion engine, to check the possibility of closing the exhaust gas recycling valve 17. For this purpose, the fact is exploited that in the case of a complete closure both of the throttle valve 12 and of the exhaust gas recycling valve 17 with simultaneous switching off of the fuel supply into the cylinders of the internal combustion engine, it is very quickly impossible for there to be any further compression in the cylinders.

Figure 4A:
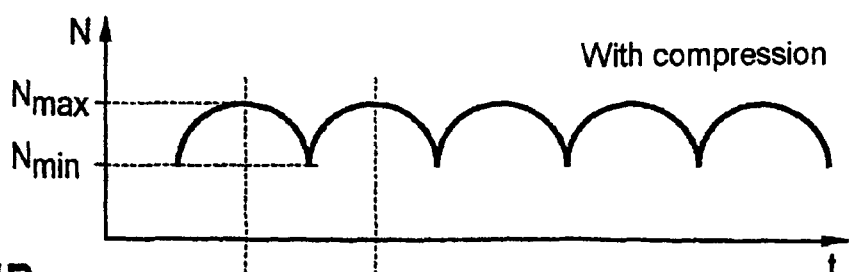
FIG. 4 shows the time profile of the rotational speed of the internal combustion engine with and without compression in a cylinder.
Figure 4B:
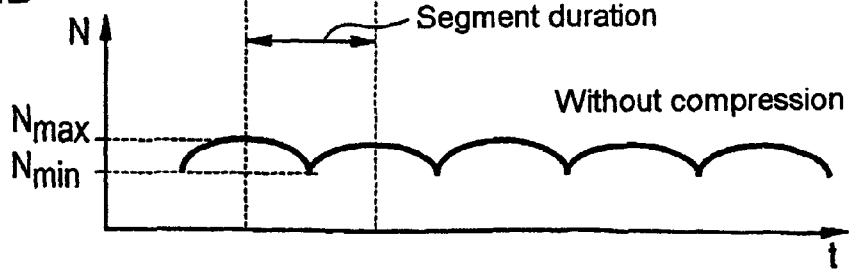

If the rotational speed of the internal combustion engine is considered correspondingly resolved in terms of crank angle and time per segment, a considerably higher rotational speed roughness can be detected within a segment in the case of compression in the cylinder (air supply into the cylinder, throttle valve and/or exhaust gas recycling valve not closed) than when there is an absence of compression (throttle valve and exhaust gas recycling valve closed). The rotational speed roughness can be expressed by means of the rotational speed difference Ndiff between the maximum rotational speed Nmax and the minimum rotational speed Nmin per segment. These relationships are illustrated graphically in FIG. 4.

For this reason, in a method step S6 the values Nmax and Nmin per segment are registered and in a method step S7 the value of the difference Ndiff=Nmax−Nmin is formed therefrom.

If the value of the difference Ndiff lies above an applicable threshold value Ndiff_SW, there has been compression in the cylinder, the cause of which can only be an exhaust gas recycling valve which cannot be closed completely, as a fault-free closure of the throttle valve has already been detected in the method step S5, and the throttle valve has thus been excluded as a possible cause of an air supply. This second interrogation in the method step S8 therefore supplies an unambiguous indication of the operational capability of the exhaust gas recycling valve.

In this case, in a method S9 there is a corresponding fault entry, for example "exhaust gas recycling valve does not close completely" in the fault memory 20.

If, on the other hand, the value of the difference Ndiff is less than or equal to the threshold value Ndiff SW, it has been possible to close the exhaust gas recycling valve 17 completely, and the exhaust gas recycling valve is detected as fault-free (method step S10).

The two above-mentioned fault entries for the exhaust gas recycling valve 17 are generally stored as codes, like any other fault entry. Furthermore, it is also expedient to make the fault entries only after statistical evaluation in order to avoid incorrect entries. Likewise, it is possible [lacuna] the result of the diagnosis, in particular when a fault occurs, to activate an acoustic and/or visual warning device, for example a fault lamp in the interior of the vehicle.

The time period T1 and the threshold values for the air mass flow rate MAF_SW and the rotational speed difference Ndiff_SW are determined experimentally by means of driving experiments and/or on the test bench and are stored in the storage device 19.

In a last method step S11, the counter for the time period T1 is then reset and the method is terminated.

What is claimed is:

1. A method for diagnosing the operational capability of an exhaust gas recycling system of an internal combustion engine having cylinders, said system comprising an exhaust gas recycling line which connects an exhaust gas tract of the internal combustion engine to an intake tract, having a throttle valve of the internal combustion engine so that exhaust gas can be recycled into the intake tract; and an exhaust gas recycling valve arranged in the exhaust gas recycling line to set a flow passage of the exhaust gas recycling line, said method comprising the following steps when a fuel supply to the cylinders is switched off and when a vehicle powered by said engine is in a stationary state:

in a first step, the throttle valve and the exhaust gas recycling valve are closed, in a second step, after expiry of a predefined time period, checking to determine whether an air mass flow rate meter signal lies below a predefined threshold value, in a third step, if said value drops below the threshold value, checking to determine whether compression has occurred in the cylinders of the internal combustion engine, and, assessing the desirability of closing the exhaust gas recycling valve as a function of the check.

2. The method as claimed in claim 1, wherein the presence of compression in the cylinders is detected by evaluating the value of a rotational speed difference between a value for a maximum rotational speed and a value for a minimum rotational speed within a crankshaft-related segment.

3. The method as claimed in claim 2, wherein an exhaust gas recycling valve is determined to be faulty if the value of the rotational speed difference (Ndiff) exceeds a predefined threshold value.

4. The method as claimed in claim 3, wherein when a faulty exhaust gas recycling valve is detected, a corresponding entry is made in a fault memory.

5. The method as claimed in claim 1, wherein the diagnosis is aborted if the signal of the air mass flow rate meter lies above the threshold valve.

6. The method as claimed in claim 1 wherein the threshold value and the time period are determined experimentally and stored in a storage device.

* * * * *